US011194705B2

(12) United States Patent
Mendelson et al.

(10) Patent No.: US 11,194,705 B2
(45) Date of Patent: Dec. 7, 2021

(54) AUTOMATICALLY INTRODUCING REGISTER DEPENDENCIES TO TESTS

(71) Applicant: International Business Machines Corporation, Armonk, NY (US)

(72) Inventors: Hillel Mendelson, Kibbutz Hahotrim (IL); Tom Kolan, Haifa (IL); Vitali Sokhin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/871,930

(22) Filed: May 11, 2020

(65) Prior Publication Data

US 2021/0349815 A1 Nov. 11, 2021

(51) Int. Cl.
*G06F 11/263* (2006.01)
*G06F 11/36* (2006.01)
(Continued)

(52) U.S. Cl.
CPC ...... *G06F 11/3692* (2013.01); *G06F 9/30043* (2013.01); *G06F 9/30101* (2013.01); *G06F 9/544* (2013.01); *G06F 11/3684* (2013.01); *G06F 11/3688* (2013.01); *G06F 12/0808* (2013.01); *G06F 12/0882* (2013.01);
(Continued)

(58) Field of Classification Search
CPC ............. G06F 11/3692; G06F 11/3688; G06F 11/3684; G06F 11/263; G06F 11/2236; G06F 11/3672; G06F 11/3648; G06F 11/302; G06F 9/30043; G06F 9/30101; G06F 9/544; G06F 9/3808; G06F 9/45504; G06F 9/3812; G06F 12/0808; G06F 12/0882
See application file for complete search history.

(56) References Cited

U.S. PATENT DOCUMENTS 7,155,708 B2 * 12/2006 Hammes ................ G06F 30/33 717/155
7,725,795 B2 * 5/2010 Sugano ............. G01R 31/3008 714/743

(Continued)

OTHER PUBLICATIONS

Harald Devos et al., Building an Application-specific Memory Hierarchy on FPGAs, 2008, [Retrieved on Jul. 29, 2021], Retrieved from the internet: <URL: https://biblio.ugent.be/publication/679232/file/713301.pdf > 10 Pages (1-10) (Year: 2008).*

*Primary Examiner* — Anibal Rivera
(74) *Attorney, Agent, or Firm* — Ziv Glasberg

(57) ABSTRACT

Method, apparatus and product for automatically introducing register dependency into tests. A test template represents an abstract test scenario to be utilized for testing a target processor. The abstract test scenario requires that a value be assigned to a register. A test that implements the abstract test scenario is generated. The test is a set of instructions that are executable by the target processor. The generation of the test comprises: determining a memory address to retain the value in a memory that is accessible to the target processor; and adding to the test an instruction to load to the register the value from the memory address, whereby adding a register dependency to the test that is not required by the abstract test scenario. The test can be executed on the target processor or simulation thereof.

18 Claims, 5 Drawing Sheets

(51) Int. Cl.

| | |
|---|---|
| ***G06F 9/302*** | (2018.01) |
| ***G06F 12/0808*** | (2016.01) |
| ***G06F 9/30*** | (2018.01) |
| ***G06F 9/54*** | (2006.01) |
| ***G06F 12/0882*** | (2016.01) |
| *G06F 9/38* | (2018.01) |
| *G06F 11/22* | (2006.01) |

(52) U.S. Cl.

CPC .......... *G06F 9/3808* (2013.01); *G06F 9/3812* (2013.01); *G06F 11/2236* (2013.01); *G06F 11/263* (2013.01); *G06F 11/3648* (2013.01)

(56) References Cited

U.S. PATENT DOCUMENTS

| | | | | |
|---|---|---|---|---|
| 9,251,045 | B2 | 2/2016 | Friedler et al. | |
| 9,316,689 | B2 * | 4/2016 | Hamid | G01R 31/3177 |
| 9,373,077 | B1 | 6/2016 | Cohen et al. | |
| 10,061,672 | B2 | 8/2018 | Dagan et al. | |
| 2004/0088691 | A1 * | 5/2004 | Hammes | G06F 30/33<br>717/158 |
| 2008/0059858 | A1 * | 3/2008 | Sugano | G01R 31/3008<br>714/743 |
| 2011/0087861 | A1 | 4/2011 | Bertacco et al. | |
| 2015/0301108 | A1 * | 10/2015 | Hamid | G01R 31/31813<br>714/724 |
| 2019/0311072 | A1 | 10/2019 | Schieve | |

* cited by examiner

AUTOMATICALLY INTRODUCING REGISTER DEPENDENCIES TO TESTS

TECHNICAL FIELD

The present disclosure relates to quality assurance in general, and to hardware verification, in particular.

BACKGROUND

Computerized devices control almost every aspect of our life—from writing documents to controlling traffic lights. However, computerized devices are bug-prone, and thus require a testing phase in which the bugs should be discovered. The testing phase, also referred to as verification phase, is considered one of the most difficult tasks in designing a computerized device. The cost of a bug may be enormous, as its consequences may be disastrous. For example, a bug may cause the injury of a person relying on the designated functionality of the computerized device. Additionally, a bug in hardware or firmware may be expensive to fix, as patching it requires call-back of the computerized device. Hence, many developers of computerized devices invest a significant portion, such as 70%, of the development cycle to discover erroneous functionalities of the computerized device.

BRIEF SUMMARY

One exemplary embodiment of the disclosed subject matter is a method comprising: obtaining a test template, wherein the test template represents an abstract test scenario to be utilized for testing a target processor, wherein the abstract test scenario requires that a value be assigned to a register; generating a test based on the test template, wherein the test implements the abstract test scenario, wherein the test is a set of instructions that are executable by the target processor; wherein said generating the test comprises: determining a memory address to retain the value in a memory that is accessible to the target processor; and adding to the test an instruction to load to the register the value from the memory address, whereby adding a register dependency to the test that is not required by the abstract test scenario; and executing the test by the target processor.

Another exemplary embodiment of the disclosed subject matter is a non-transitory computer readable medium retaining program instructions, which program instructions when read by a processor, cause the processor to perform a method comprising: obtaining a test template, wherein the test template represents an abstract test scenario to be utilized for testing a target processor, wherein the abstract test scenario requires that a value be assigned to a register; generating a test based on the test template, wherein the test implements the abstract test scenario, wherein the test is a set of instructions that are executable by the target processor; wherein said generating the test comprises: determining a memory address to retain the value in a memory that is accessible to the target processor; and adding to the test an instruction to load to the register the value from the memory address, whereby adding a register dependency to the test that is not required by the abstract test scenario; and executing the test by the target processor.

Yet another exemplary embodiment of the disclosed subject matter is a computerized apparatus having a processor and coupled memory, the processor being adapted to perform the steps of: obtaining a test template, wherein the test template represents an abstract test scenario to be utilized for testing a target processor, wherein the abstract test scenario requires that a value be assigned to a register; generating a test based on the test template, wherein the test implements the abstract test scenario, wherein the test is a set of instructions that are executable by the target processor; wherein said generating the test comprises: determining a memory address to retain the value in a memory that is accessible to the target processor; and adding to the test an instruction to load to the register the value from the memory address, whereby adding a register dependency to the test that is not required by the abstract test scenario; and executing the test by the target processor.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
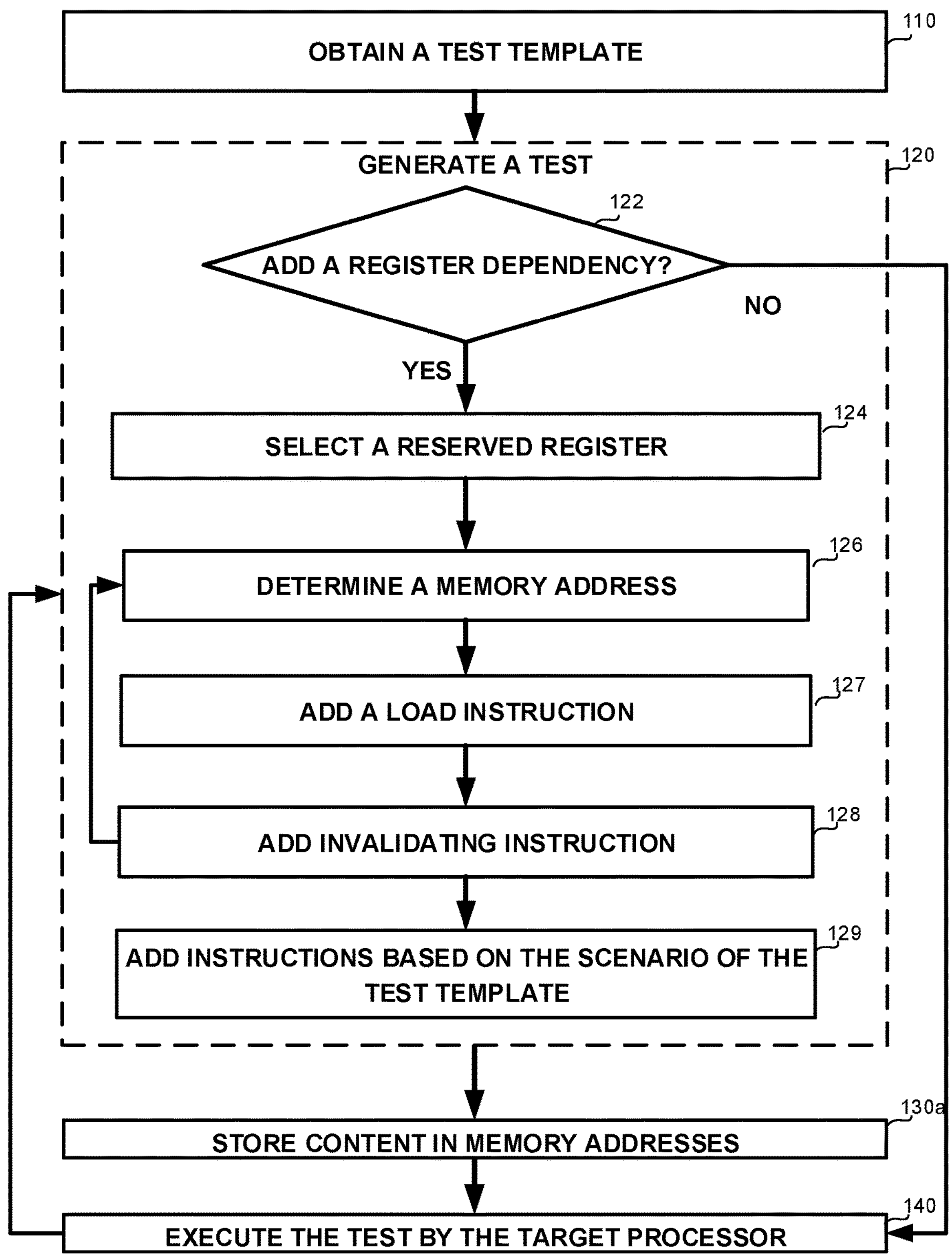
FIG. 1A shows a flowchart diagram of a method, in accordance with some exemplary embodiments of the disclosed subject matter.

One technical problem dealt with by the disclosed subject matter is to verify a target processor. The target processor may be a general-purposes processor, a Central Processing Unit (CPU), an Integrated Circuit (IC), or the like. More specifically, the technical problem may be to verify that the target processor is exhibiting expected and correct behavior regarding memory access operations.

In some exemplary embodiments, verifying the target processor may require simulation or execution of many test-cases, also referred to as tests. A user, an engineer, or the like, may define one or more abstract test scenarios that should be verified. Each abstract test scenario may be defined using a test template. A test template may comprise directives providing the outline of the scenario to be tested, each pf which may represent a plurality of alternative sets of one or more instructions to the processor. A plurality of tests may be generated based on the same test template, each of which may be a different implementation of the scenario. As an example, the tests may differ in the actual instructions, operands, addresses, or the like, while preserving the constraints, relationships, and the like that are the basis of the scenario. A test generator may generate the test based on the constraints defined by the test template. In some exemplary embodiments, one or more directives in the test template may define constraints, such as a type of instruction, constraint on the operands, constraint on the addresses used, or the like. A test generated based on the test template may be executed by the target processor, to determine whether the processor functions correctly. In some cases, the test may be executed using a simulator of the design of the target processor, such as in case the target processor is not yet fabricated. Additionally or alternatively, the test may be executed on the target processor itself, such as in a post-silicon verification phase.

In some exemplary embodiments, the disclosed subject matter may be utilized in post silicon verification. In some exemplary embodiments, post silicon verification may be performed with respect to a fabricated processor that is available. In some exemplary embodiments, during post silicon verification, an executable may be loaded to the target processor and used for testing the target processor. In some exemplary embodiments, the executable may cause the target processor to generate the tests, execute them and verify their outcome. In some exemplary embodiments, the executable may be generated off-device, such as by generating a binary that can be executed using the instruction set of the target processor.

Another technical problem dealt with by the disclosed subject matter is to increase efficiency of existing tests. In some exemplary embodiments, it may be desired to add register dependency between operations in a test, which may reveal bugs. In the context of the disclosed subject matter, a verification engineer may write a test template in order to define a scenario that should be verified. A generator may generate a plurality of tests that should verify the scenario. It may be desired to randomly inject register dependencies to the test, thereby increasing coverage of the verification phase and better verifying that the processor functions properly, even in the face of malicious code. As an example, the security vulnerability known as SPECTRE may be exploited by providing code with a long chain of register dependencies between instructions, causing the processor to implement speculative execution techniques, in which lies the SPECTRE vulnerability.

One technical solution is to obtain a test template, generate a test based thereon and add an instruction to load a value to a register from a memory address, that is not required by the test template itself, and execute such test. In some exemplary embodiments, the test template may represent an abstract test scenario. The test scenario may require that a value may be assigned to a register. In some exemplary embodiments, the value may be any number required by the abstract scenario, required by the test, or the like. As an example, the abstract scenario may require that a value is stored in a memory address and loaded therefrom later on. The memory address may be a constant value that is utilized by the test. In some exemplary embodiments, the memory address may be a constant value determined for the specific test and may vary from one test to the other. Additionally, or alternatively, the memory address may be defined as a constant value in the test template itself. As another example, the test template may require that one operand of an instruction receives an even number. The even number may be a pre-determined constant value indicated in the template itself (e.g., the number 2). Additionally, or alternatively, the even number may be determined during the generation of the test, such as based on a constraint defined in the test template (e.g., a number for which modulo 2 is 0).

It is noted that in accordance with the test template, the value may be utilized in a load operation, a branch operation, a store operation, or the like.

In some exemplary embodiments, a memory address may be determined. The memory address may be utilized to retain the value. In some exemplary embodiments, the memory address may be an address in a memory that is accessible by the target processor. In some exemplary embodiments, the target processor may be configured to access the memory by utilizing a Memory Management Unit (MMU), a Paged Memory Management Unit (PMMU), or the like.

In some exemplary embodiments, a load instruction may be added to the test. The load instruction may be an instruction to load the value from the memory address to a register. In some exemplary embodiments, the value of the register may be utilized instead of directly utilizing the value. In some exemplary embodiments, the load instruction may not be required by the test template. Additionally, or alternatively, the load instruction may not violate any of the constraints defined by the test template.

In some exemplary embodiments, adding the load instruction may add a register dependency to the test. The load instruction may be of the form “ld target, source, offset”, where target is a target register in which the information will be retained after retrieved from memory, source is a register retaining a memory address and offset is an offset value defining the offset from the base value retained in the source register. As a result, usage of the target register in the test may depend on the outcome of the load instruction that was introduced and on the content of the source register. In some cases, additional register dependency that is not required by the abstract test scenario defined in the test template is introduced to the test. In some exemplary embodiments, a chain of load instructions may be introduced before loading the value, such as in an design pattern of loading information from a linked list.

In some exemplary embodiments, the test may be executed by the target processor. The test may be executed in order to verify that the target processor and the embedded software are performing as expected.

In some exemplary embodiments, during the generation phase it may be determined automatically, such as randomly, heuristically, or the like, whether to introduce link dependency. In some exemplary embodiments, in each generation of a test, a different determination may be performed, thereby introducing different register dependencies in each test case. In some exemplary embodiments, the introduction of register dependencies may be orthogonal to the scenario that is being tested by the abstract test scenario, and may not require any manual work from the point of view of the verification engineer. Hence, a given abstract test scenario provided by the engineer may be automatically augmented. Additionally, or alternatively, a register to be used to load constant values from memory be selected, e.g., randomly, heuristically, or the like. In some exemplary embodiments, the selection may be made between registers that are not being used in the test template itself, in the generated test, or the like. Additionally, or alternatively, the register may be a pre-reserved register. The verification engineer may avoid utilizing the pre-reserved register in the test template.

In some exemplary embodiments, a memory buffer may be determined. The memory buffer may be a region in the memory that is accessible by the target processor. The memory buffer may be accessible using one or more memory address. Determining the memory buffer may comprise determining a base address of the memory buffer, a size of the memory buffer, or the like. During generation of the test, the content of the memory buffer may be determined. The content may comprise values to be used by the test, such as memory addresses, constant operand values, or the like. In some exemplary embodiments, during execution, the buffer may be accessed using load instructions. The load instruction may utilize a reserved register to retain the memory address of the memory buffer, the base address of the memory buffer, or the like. In some exemplary embodiments, an instruction to load a value to a register may comprise accessing the memory buffer using the reserved register. In some exemplary embodiments, the reserved register may retain the base address of the memory buffer, and the load instruction may further comprise an offset from the base address.

In some exemplary embodiments, the processor may have multiple execution entities, such as hardware threads, cores, or the like, generally referred to herein as "threads". Each thread may be associated with a different memory buffer. Constants value or constants addresses utilized by the thread may be stored in the memory buffer. In some exemplary embodiments, in different contexts, different buffers may be accessed and utilized. In some exemplary embodiments, accessing the buffers may be performed using the same reserved register in all contexts, using different registers in different contexts, or the like.

In some exemplary embodiments, in order for the test to have the content of the memory buffer available thereto, the filled memory buffer may be loaded onto the memory together with the loading of the test. Additionally or alternatively, the test may comprise initial phase in which the content of the memory buffer may be set. The memory buffer may be filled during execution, such as using a plurality of instructions to set the content of the memory buffer as was determined in the generation phase. In some exemplary embodiments, the instruction in which a value is stored in the memory buffer may be performed prior to the execution of the instruction to load that value from the memory buffer.

One technical effect of utilizing the disclosed subject matter is to provide high-quality verification of a target processor. The disclosed subject matter may be utilized to ensure that memory access operations performed by a target processor are tested. By adding register dependencies, bugs associated with register dependencies, such as creating security vulnerabilities or other malfunctions, may be discovered.

Another technical effect is to automatically introduce potentially intricate dependencies into generated tests, without manual complication of the test template, without manual work of the verification engineer and in an orthogonal manner to the scenarios defined by the verification engineer. In some cases, as the disclosed subject mater is automated, it is less prone to user error. Additionally or alternatively, the disclosed subject matter provides for a significant rise in test complexities.

In some cases, deep speculation in modern processors is difficult to achieve as it may require complex control or data path dependencies. The disclosed subject matter may enable creation of such deep speculation in a manner that does require manual labor and is non-obtrusive to the generated test.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1A showing a flowchart diagram of a method, in accordance with some exemplary embodiments of the disclosed subject matter.

On Step 110, a test template may be obtained. The test template may be utilized for testing a target processor, for verifying a target processor, or the like. In some exemplary embodiments, the test template may define an abstract test scenario, a general test, or the like. In some exemplary embodiments, the test template may require that a value may be assigned to a register. In some cases, the value may be a constant value. The constant value may a constant integer, a constant address, or the like. In some exemplary embodiments, the test template may comprise one or more directives indicating that the constant value may be assigned to a register.

On Step 120, a test may be generated based on the test template. The test may be an instantiation of the abstract test scenario. The test may comprise one or more instructions, such as instructions from the instruction set of the target processor. Each instruction may be executable by the target processor. In some exemplary embodiments, generating the test may comprise performing steps 122-129.

It may be noted, that generating the test may provide for an executable binary that can be executed by the target processor. However, the executable may be generated without the use of a compiler. In some cases, a compiler may not necessarily be available for the target processor and may be in development. Additionally, or alternatively, the compiler may perform optimizations that could break out of the scenario depicted in the abstract test scenario, such as removing instructions that do not affect the outcome of the execution. However, such optimizations rely on the target processor functioning correctly in assuming that the removal of such instructions would not affect the outcome, and such assumption cannot be made during the verification phase. It is further noted that compilers introduce data structures, such as the stack, into executables. However, the abstract test scenario may be devoid of such data structures.

On Step 122, it may be determined whether to add a register dependency to the test. In some exemplary embodiments, the determination of whether to add register dependency may be random, so as to provide some tests in which register dependency is added, and others in which the register dependency is not added. Additionally or alternatively, the determination may be based on heuristics. As an example, the determination may be biased towards adding register dependencies in cases where the abstract test scenario is likely to be affected by a register dependency. In some cases, the heuristic may be based on the directives of the test template, on instructions selected for implementing the directives, or the like. Additionally, or alternatively, the heuristics may be non-deterministic, such as involving a random or pseudo random determination. In some exemplary embodiments, the determination may be whether to add register dependency at all. Additionally, or alternatively, the determination may be whether to add register dependency with relation to a specific value, such as determining that only a portion of the values used in the test would be converted to load instructions (e.g., instead of simple assignment instructions).

In some exemplary embodiments, a register dependency may comprise one operation using a register as a source, that depends on an outcome of another operation using the register, as a target. Put differently, the value of the register may depend on the outcome of a previous operation which is potentially affect by values of the other registers. In some exemplary embodiments, adding a plurality of register dependencies to the abstract test scenario may increase effectiveness of the test, and may potentially uncover errors, bugs and vulnerabilities.

In some exemplary embodiments, the register dependency may be a load-load register dependency. In some exemplary embodiments, the load-load register dependency may comprise a load instruction followed by a second load instruction, that depends on the first instruction. For example, the first instruction may load a memory address to a register from the memory, and the second instruction may utilize the first register to indicate the memory address from which information is to be retrieved when loaded the second register. In some exemplary embodiments, the second load instruction may be required by the abstract test scenario and the first load instruction may be added to introduce the register dependency. Additionally, or alternatively, there may be a chain of load-load-load instructions (e.g., comprising any number of instructions), such as when traversing a linked list, an i-node structure, or the like, ending with the load instruction that is dictated by the abstract test scenario.

In some exemplary embodiments, the register dependency may be a load-branch register dependency. In those embodiments, the load-branch register dependency may comprise a load instruction setting value to a register followed by a branch instruction that utilizes the value of the register. As an example, a load instruction may be used to load from memory a value representing a memory address. The memory address may be loaded into a register. The branch instruction may utilize the register and perform a branch operation to the memory retained therein. In some exemplary embodiments, the branch instruction may be required by the abstract test scenario and the load instruction may be added to introduce the register dependency Additionally, or alternatively, there may be a chain of load-load-load instructions (e.g., comprising any number of instructions), such as when traversing a linked list, an i-node structure, or the like, followed by the branch instruction that is dictated by the abstract test scenario.

In some exemplary embodiments, the register dependency may be a load-store register dependency. In those embodiments, the load-store register dependency may comprise a load instruction, loading value into a register, followed by a store instruction utilizing the register. The store instruction may utilize the register for retaining the value to be stored. Additionally, or alternatively, the store instruction may utilize the register for retaining the memory location in which the value is to be stored. In some exemplary embodiments, the store instruction may be required by the abstract test scenario and the load instruction may be added to introduce the register dependency Additionally, or alternatively, there may be a chain of load-load-load-store instructions (e.g., comprising any number of instructions), such as when traversing a linked list, an i-node structure, or the like, followed by the store instruction that is dictated by the abstract test scenario.

On Step 124, a reserved register may be selected. The reserved register may be selected from a plurality of available registers. In some exemplary embodiments, the reserved register may be a-priori selected, such as in a hard-coded manner. It may be verified that the test template does not require usage of the reserved register, and that the test that is generated does not use the reserved register for any purpose besides that of the disclosed subject matter. Additionally, or alternatively, a list of registers that are utilized in the test may be determined. The reserved register may be selected from the remaining non-used registers, e.g., registers not listed in the above-mentioned list of registers.

It is noted that in some embodiments, the same reserved register may be utilized for all execution entities. Such an embodiment, may also test the MMU of the target processor for correctly loading different memory locations in different contexts although the same register is utilized in both. Additionally, or alternatively, different registers may be selected for different execution entities.

In some exemplary embodiments, during the generation of a test, when a value is determined to be needed, e.g., dictated as being assigned to a register, Steps 126-128 may be performed.

On Step 126, a memory address may be determined. The memory address may be an address in a memory that the target processor is configured to utilize in order to store data, load data, or the like. The data may be utilized by the target processor for performing computations, for performing a task, or the like. The determined memory address may be a location within the memory to be used to retain the value that is used by the test.

In some exemplary embodiments, a memory buffer may be utilized by the target processor to retain one or more values. Each entry in the buffer may be offseted from a base address of the memory buffer. In some exemplary embodiments, determining the memory address may comprise determining an offset from the base address of the memory buffer. As an example, the first encountered value may be located at the base address, the second encountered value may be located in the next location, offseted according to the size of the first encountered value, and so on, resulting in a buffer of consecutive values, each of which is accessible using the same base address and a different offset. In one example, each value is in a size of a 8 Bytes, and accordingly the offset is increased by 8 after each encountered value. In some exemplary embodiments, each execution entity may utilize a different memory buffer (located in a different memory location).

On Step 127, a load instruction may be added to the test. In some exemplary embodiments, the load instruction may comprise loading a value from the memory address to a register. The load instruction may be configured to load the value from the memory address determined on Step 126 (e.g., a specific address, a base address and an offset, or the like), and into a register. In some exemplary embodiments, the reserved register (or another register) may retain the memory address. The load instruction may utilize the reserved address to indicate from which memory location the value is to be retrieved. In some exemplary embodiments, the load instruction is not an instruction that is required by the abstract test scenario defined by the test template. Additionally or alternatively, the load instruction may be added in addition to the instructions required due to the test template (e.g., instructions generated in Step 129).

In some exemplary embodiments, instead of loading the content directly from memory using a single load instruction, a chain of load instructions may be implemented, each of which useful for loading a memory address of the next address, until reaching a final address which retains the content to be used in the test itself. In some exemplary embodiments, the memory addresses used along the chain of load instructions may point to different memory pages, so as to increase the stress of the MMU of the target processor.

On Step 128, an invalidating instruction may be added to the test. In some exemplary embodiments, the invalidating instruction, when executed by the target processor, may cause to one or more pages retaining at least a portion of the memory buffer to be invalidated. As a result, accessing a memory address comprised by the memory buffer may cause a page fault and loading the portion of the memory buffer. In some exemplary embodiments, such invalidating instruction may be useful to stress the MMU even further, requiring re-loading of pages. It is noted that as the memory buffer may retain constant values, page fault may naturally occur due to eviction of the page from cache, such as when a new page is loaded and an existing page must be removed to make room for the new page. However, such a scenario is less likely to occur in short tests, and in such tests accessing a read-only memory buffer may be less likely to cause a page fault. Purposefully invalidating the buffer may be useful for testing. It is further noted that similarly to Step 127, the instruction added on Step 128 may not be required by the test template.

On Step 129, one or more instructions may be added to test based on the scenario of the test template. In some exemplary embodiments, the test template may comprise one or more directives. Each directive may yield a set of instructions that may be added to the test. In some exemplary embodiments, each directive may be implemented as an alternative set of one or more instructions, with alternative potential operand values, such as implementing the abstract test scenario defined in the test template.

On Step 130*a*, the content of the memory addresses, determined on Step 126, which points to the content to be loaded in the instructions added on Step 127, may be set in memory. In some exemplary embodiments, the memory addresses may be a sequential set of addresses, forming a buffer. The content of the memory buffer may be filled. In some exemplary embodiments, Step 130*a* may be performed on-device, prior to executing the test. In some exemplary embodiments, when the test is loaded onto the execution platform (e.g., simulator in case of pre-silicon verification, the processor in case of post-silicon verification, or the like), the content of the memory addresses may be loaded from memory. In some exemplary embodiments, the content of the memory addresses may be loaded from memory as part of the image of the test.

On Step 140, the test may be executed by the execution platform, such as the target processor or simulation thereof. In some exemplary embodiments, the test may be associated with a desired outcome. Executing the test may comprise comparing an outcome of the test and the desired outcome. In case that the desired outcome is different than the test outcome, a notification may be provided to a user. Additionally, or alternatively, an outcome of the test may be provided.

Figure 1B:
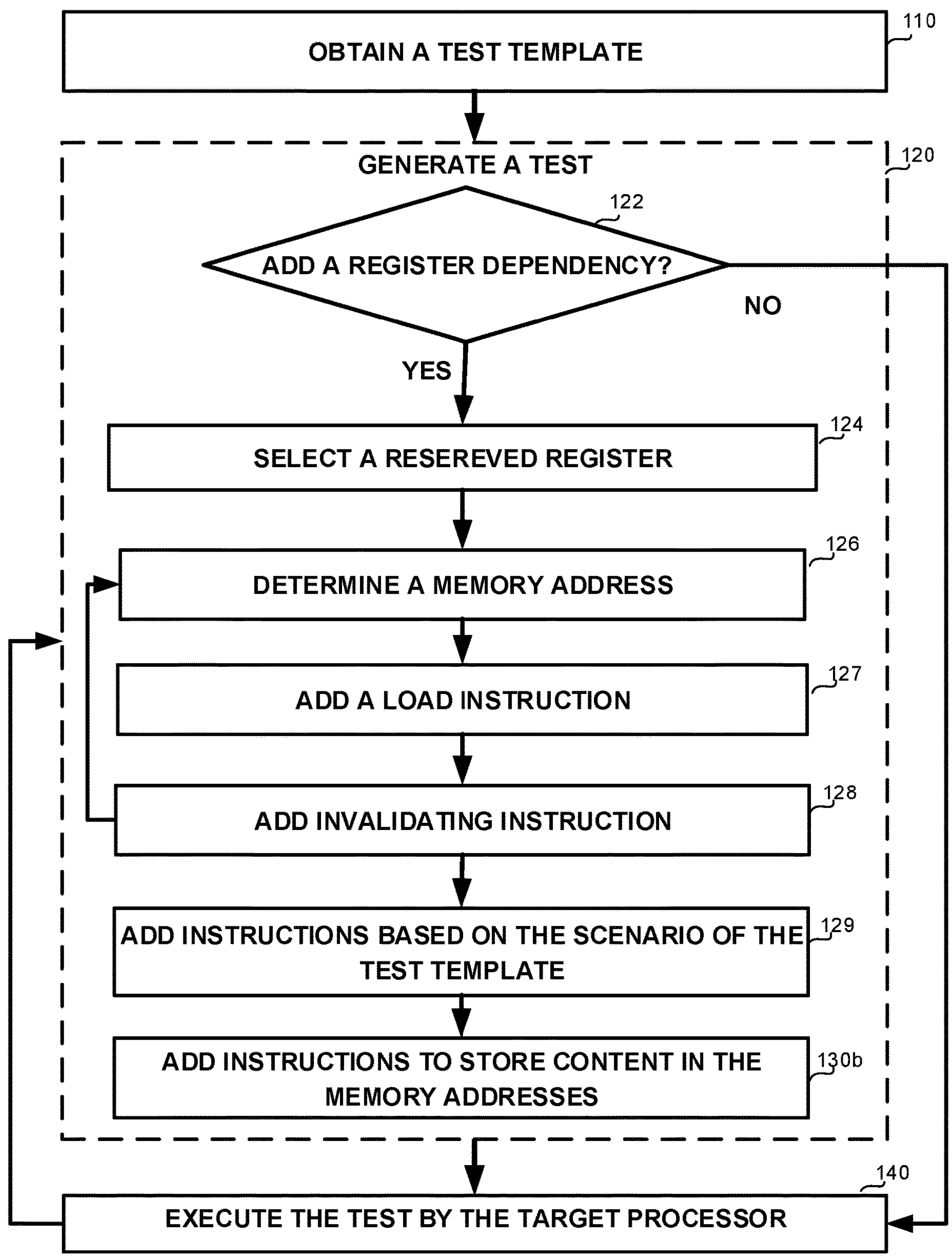
FIG. 1B shows a flowchart diagram of a method, in accordance with some exemplary embodiments of the disclosed subject matter.

Referring now to FIG. 1B showing a flowchart diagram of a method, in accordance with some exemplary embodiments of the disclosed subject matter.

In some exemplary embodiments, instead of pre-loading the content of the memory addresses prior to execution of the test (e.g., Step 130*a* of FIG. 1A), the generated test may include instructions to set the content to the memory addresses. On Step 130*b*, a set of one or more instructions to store content in the memory addresses may be added. In some exemplary embodiments, the instructions may be store instructions configured, when executed, to store values in the respective memory addresses. In some exemplary embodiments, the instructions may be added as the first instructions to be executed in the test, such as in an initialization phase of the test. Additionally or alternatively, the instruction to store content in a memory address may be added to the test so as to be executed before execution of the corresponding load instruction (e.g., added on Step 127).

Consider, a test template that causes the generation of a test:

```
r8←1000
ld r6, r8
```

As an example, the test template may require loading of a value from a memory location, loading of a value using a specific register, loading a value from a specific region in memory, or the like. The value 1000 may be a constant value in the test template or may be selected from a plurality of potential values (e.g., 10<VALUE<5000) and be set as a constant value in the test. Additionally or alternatively, the registers r8 and r6 may be selected automatically during the generation of the test or may be hard-coded in the test template itself.

In accordance with the disclosed subject matter, in case register dependency is to be added (e.g., Step 122), the test that is generated may be:

```
r23←buffer pointer
ld, r8, 0 (r23)
ld r6, r8
```

In some exemplary embodiments, r23 may be the reserved register (e.g., selected on Step 124). Additionally or alternatively, at offset 0 from the value of r23, the constant value of 1000 may be set (e.g., pre-set on Step 130*a*, or using an instruction of the test added on Step 130*b*).

In some exemplary embodiments, in case there is a chain of load instructions, the following may be generated:

```
r23←buffer pointer
ld, r23, 0 (r23)
ld r23,0 (r23)
ld r8,0 (r23)
ld r6, r8
```

As can be appreciated, in this example, the first load instruction may load from the memory buffer, an address of a second location. From the second location, using the same reserved register, r23, an address of a third location is loaded. The third location may retain the content itself, which may be loaded, in the third load instruction, to the target register, r8, to be used in the remainder of the test.

As another example, the test to be generated may be:

```
r8←1000
mtctr r8
r9←2000
mtcr r9
beqctr
```

In accordance with the disclosed subject matter, when register dependency is added using reserved register r23 pointing to the memory buffer (also referred to as "buffer pointer"), the following may be generated:

```
r23←buffer pointer
ld r8,8(r23)
mtctr r8
ld r9,16(r23)
mtcr r9
beqctr
```

As can be appreciated, each time an item is loaded from memory a different offset is used (e.g., the value of 1000 is stored at offset 8, while the value of 2000 is stored at offset 16).

Figure 2:
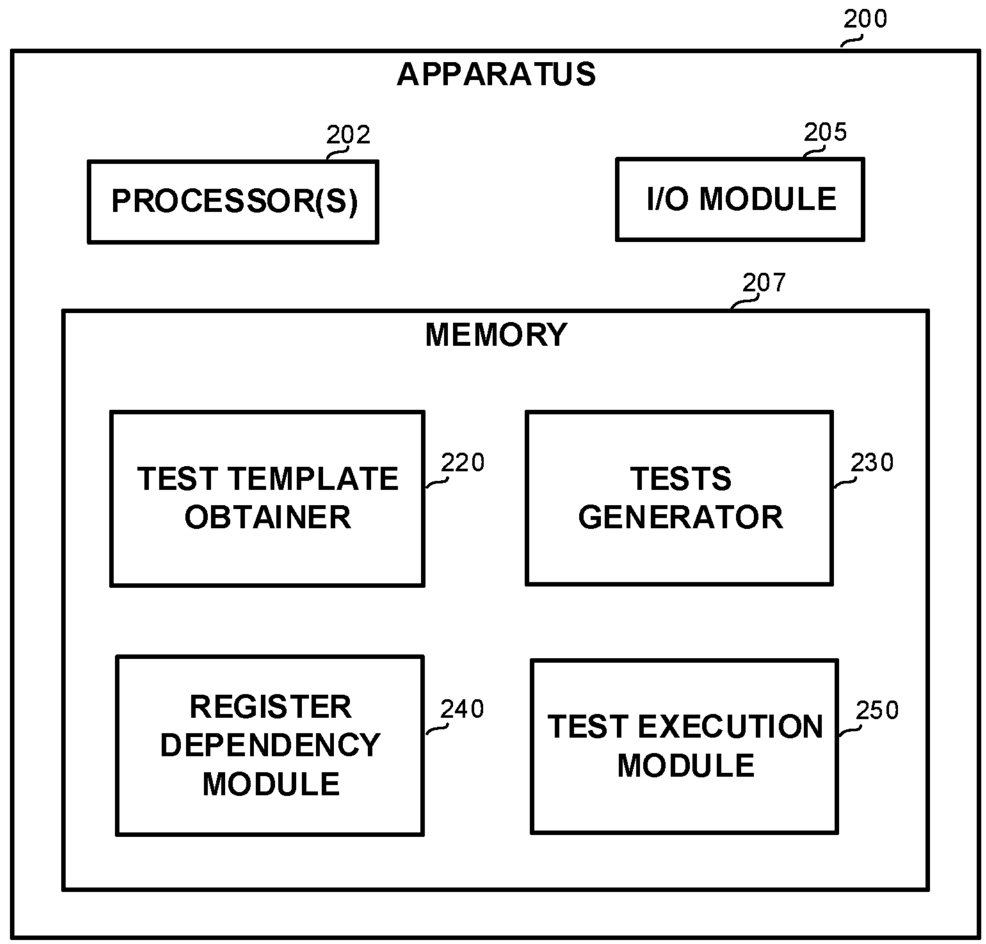
FIG. 2 shows a block diagram of an apparatus, in accordance with some exemplary embodiments of the disclosed subject matter.

Referring now to FIG. 2 showing a block diagram of an apparatus, in accordance with some exemplary embodiments of the disclosed subject matter.

In some exemplary embodiments, Apparatus 200 may comprise one or more Processor(s) 202. Processor 202 may be a Central Processing Unit (CPU), a microprocessor, an electronic circuit, an Integrated Circuit (IC) or the like.

Processor 202 may be utilized to perform computations required by Apparatus 200 or any of its subcomponents.

In some exemplary embodiments, Apparatus 200 may comprise an Input/Output (I/O) module 205. I/O Module 205 may be utilized to provide an output to and receive input from a user, such as, for example obtain a test template from an external database, save outcomes of tests to an external database, display results to a user, or the like.

In some exemplary embodiments, Apparatus 200 may comprise Memory 207. Memory 207 may be a hard disk drive, a Flash disk, a Random Access Memory (RAM), a memory chip, or the like. In some exemplary embodiments, Memory 207 may retain program code operative to cause Processor 202 to perform acts associated with any of the subcomponents of Apparatus 200. Memory 207 may comprise one or more components as detailed below, implemented as executables, libraries, static libraries, functions, or any other executable components.

In some exemplary embodiments, Test Template Obtainer 220 may be configured to obtain a test template. The test template may be similar to the test template that is obtained on Step 110 of FIG. 1A.

In some exemplary embodiments, Tests Generator 230 may be configured to generate tests based on the test template. The test generation may be performed in a similar manner to that performed on Step 120 of FIG. 1A.

In some exemplary embodiments, Register Dependency Module 240 may be configured to add one or more register dependency to the test. In some exemplary embodiments, Register Dependency Module 240 may be configured to determine whether or not to add register dependency into a generated test. In some exemplary embodiments, in case register dependency is to be introduced, Register Dependency Module 240 may be configured to determine and allocate memory locations, such as a memory buffer, to be used to retain values used in the test. Additionally or alternatively, Register Dependency Module 240 may be configured to add instructions to the test that are not required by the abstract test scenario defined in the test template, such as load instructions (e.g., Step 127 of FIG. 1A), invalidating instructions (e.g., Step 128 of FIG. 1A), instructions to populate the content of the memory buffer during execution (e.g., Step 130*b* of FIG. 1B).

In some exemplary embodiments, Test Execution Module 250, may be configured to execute one or more tests. In some exemplary embodiments, Test Execution Module 250 may be configured to execute the test on a simulation platform simulating the functionality of the target processor. Additionally or alternatively, Test Execution Module 250 may be configured to load the test on a fabricated target processor, in an automatic or semi-automatic manner, and invoke execution thereof.

Figure 3A:
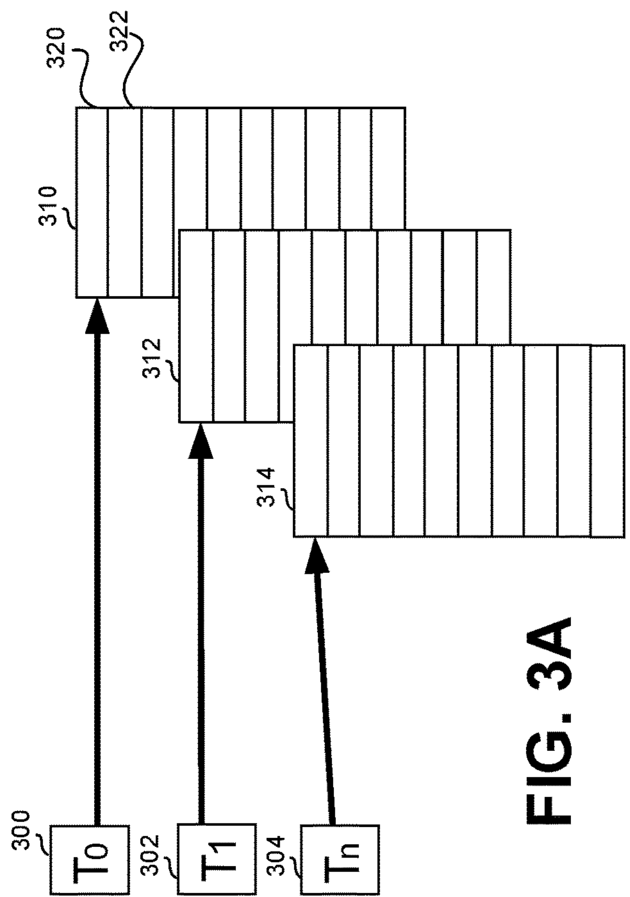
FIG. 3A illustrates a register dependency and a chain of load instructions, in accordance with some exemplary embodiments of the disclosed subject matter.

Referring now to FIG. 3A showing a schematic illustration of an exemplary environment and architecture in which the disclosed subject matter may be utilized, in accordance with some exemplary embodiments of the disclosed subject matter.

In some exemplary embodiments, the target processor may provide concurrent execution using a set of threads, exemplified using Threads 300, 302, 304. For each thread, a different memory buffer is allocated. Buffer 310 is allocated for Thread 300; Buffer 312 is used by Thread 302; and Buffer 314 is used for Thread 304. In some exemplary embodiments, values, such as constant values and memory address, may be retained in a dedicated per-thread buffer, based on the thread in which such values are to be used. The memory buffers may be allocated per thread, in any location. In some exemplary embodiments, the allocation may be in a random location. The memory location may be protected memory location, a secured memory location, a memory location that can be invalidated, or the like.

In some exemplary embodiments, during generation, data is saved to each buffer, using a base location of the buffer and an offset. After a value is saved to a location, the offset of the buffer is incremented so that the next value is stored in the next location in the buffer. As an example, the first value to be used by Thread 300 may be stored in Location 320 which can be accessed by the base address of Buffer 310 and an offset of zero. The second value to be used by Thread 300 may be stored in Location 322 which can be accessed by the base address of Buffer 310 and an offset of a single unit (e.g., a single byte (1), a single word (4), or the like).

Figure 3B:
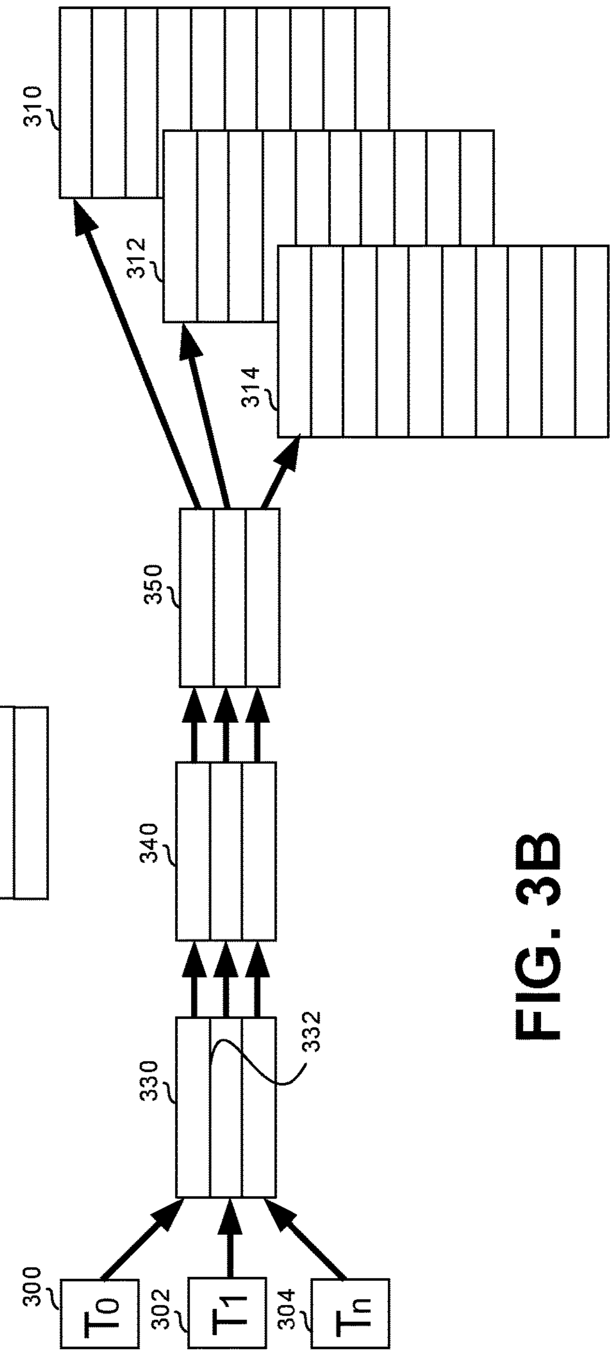
FIG. 3B illustrates utilization of a reserved register, in accordance with some exemplary embodiments of the disclosed subject matter.

Referring now to FIG. 3B showing a schematic illustration of an exemplary environment and architecture in which the disclosed subject matter may be utilized, in accordance with some exemplary embodiments of the disclosed subject matter. FIG. 3B may illustrate an architecture that introduces a chain of load instructions. In this example, before reaching Buffer 310, a sequence of load instructions must be performed. In some exemplary embodiments, each of the Memory Locations 330, 340, 350 may be retained in a different memory page. Additionally, or alternatively, Memory Location 332, used by Thread 302, may be located in the same page as Memory Location 330, increasing complexity of the test. Additionally or alternatively, the virtual addresses of Memory Locations 330, 332 may be identical, while the physical addresses may be different, thereby increasing the complexity of the test from the MMU's aspect. In some exemplary embodiments, a same reserved register may be utilized for retrieving the values from Locations 330, 340, 350. For example, r23 may be the reserved register, and it may be initialized, in Thread 300, with the address of the list head, Memory Location 330. A load instruction (e.g., ld r23, 0(r23)) may be utilized to load the value therein back to the reserved register, thereby using r23 to point to Memory Location 340. A second load instruction (e.g., ld r23, 0(r23)) may be utilized to load the address pointing to Memory Location 350 to the reserved register. A third load instruction (e.g., ld r23, 0(r23)) may be used to address pointing to Buffer 310. A last load instruction may be utilized to load the value from the desired location within Buffer 310 to a target register (e.g., ld r6, 0x20 (r23), where r6 is the target register and 0x20 is the offset of the desired location within Buffer 310).

In some exemplary embodiments, such architecture may be useful for simulating page translations. Additionally or alternatively, such architecture may automatically create register dependencies in general and in post-silicon validation tests in particular. Additionally or alternatively, such architecture may implement MMU stressing. Additionally or alternatively, such architecture may provide automated pointer-chasing verification.

Figure 4:
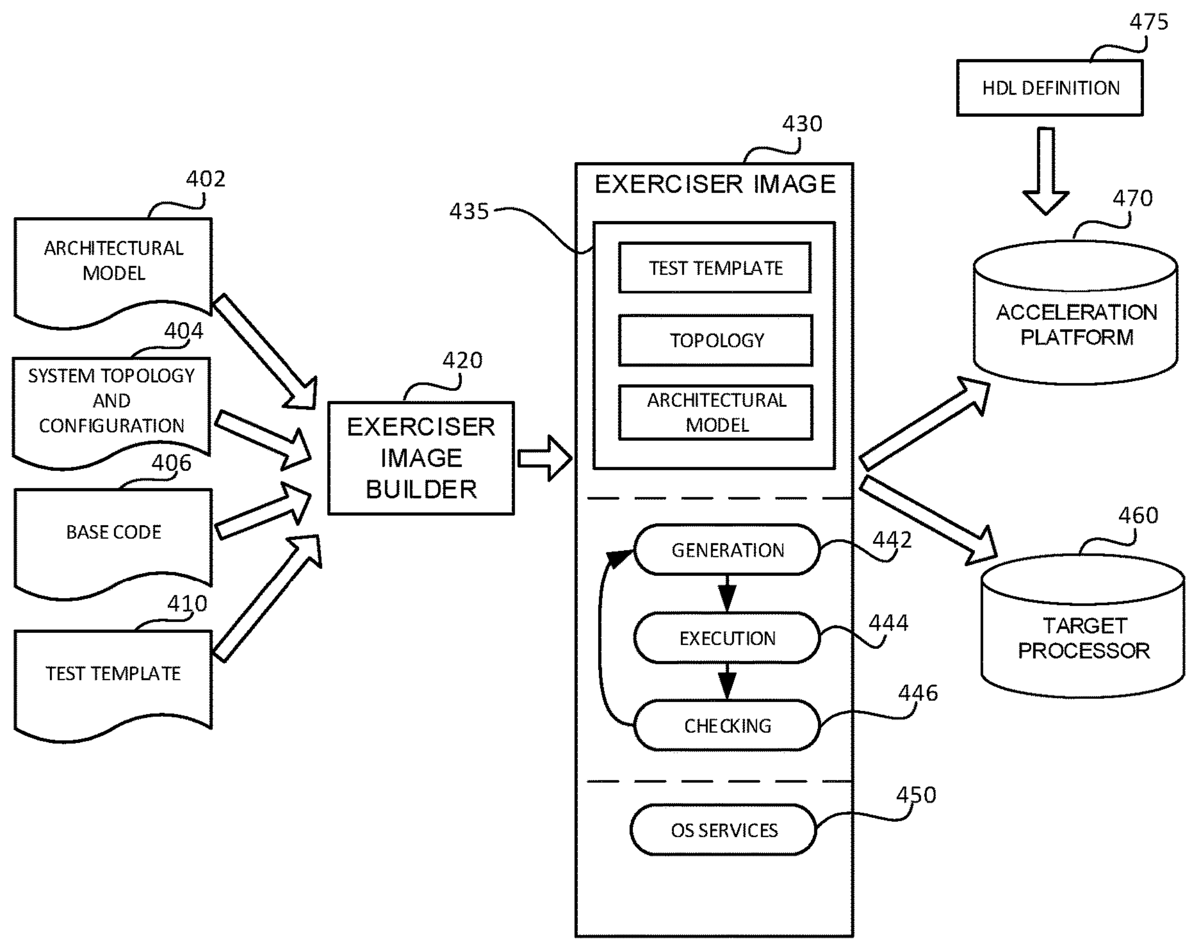
FIG. 4 shows a schematic illustration of an exemplary environment and architecture in which the disclosed subject matter may be utilized, in accordance with some exemplary embodiments of the disclosed subject matter.

Referring now to FIG. 4, showing an illustration of a computerized environments in accordance with some exemplary embodiments of the disclosed subject matter. FIG. 4 may illustrate a post-silicon verification scenario.

An Exerciser Image Builder 420 may be configured to generate an Exerciser Image 430. Exerciser Image Builder 420 may be a computerized tool, such as implemented in hardware, software, a combination thereof, or the like. Exerciser Image Builder 420 may be configured to take different inputs as data which based thereon Exerciser Image 420 may be built.

In some exemplary embodiments, Architectural Model 402 may be provided as input, and portions thereof may be inserted to a Data Section 435 of Exerciser Image 430. Architectural model 402 may be utilized by Exerciser Image 420 to generate test cases that invoke different architectural aspects of the target device. Additionally or alternatively, System Topology and Configuration 404 may be provided as input and portions thereof may be retained in Data Section 435. Topology and configuration information may be utilized by Exerciser Image 430 to generate test cases that test different aspects of the topology and configuration of the target device. Additionally, or alternatively, Base Code 406 may be provided as input. Base Code 406 may comprise program instructions to be added to Exerciser Image 430. In some exemplary embodiments, Exerciser Image 430 may be based on Base Code 406. The program instructions may be operative to perform generation-execution-checking loop (442, 444, 446). Additionally, or alternatively, Base Code 406 may comprise program instruction providing OS services, such as OS Services 450. Additionally, or alternatively, Test Template 410 or a plurality of similar templates may be provided as input and may be retained in Data Section 435 to allow Exerciser Image 430 to perform generation based upon abstract outline of operations provided by the Test Template 410.

In some exemplary embodiments, Exerciser Image Builder 420 may be configured to manipulate any input provided to it before storing corresponding data in Data Section 435. In one embodiment, Exerciser Image Builder 430 may strip down information that is not needed by the Exerciser Image 420 and/or may pre-calculate information to reduce amount of data to be retained in the binary image.

In some exemplary embodiments, Exerciser Image 430 may comprise Data Section 435 that may retain useful information such as test template based upon generation may be performed (e.g., 410), topology and configuration information, architectural model information or the like.

In some exemplary embodiments, Exerciser Image 430 may comprise program instructions designed to cause the Target Processor 460 to repeatedly perform generation of a test case (442), execution of the test case (444) and checking results of executing the test case (446). Checking operations (446) may be based on consistency checks. As an example, the same test case may be executed a plurality of times, and the results may be compared for consistency.

Exerciser Image 430 may comprise OS Services 450, an Additional Software Layer (ASL), useful for providing the Exerciser Image 430 with functionality that is not provided by a bare-metal product, such as Target Processor 460. OS Services 450 may provide functionalities such as interrupt handlers, locking, logging, I/O services, software-based context switch, or the like.

Exerciser Image 430 may be loaded onto a platform, such as Target Processor 460. Exerciser Image 430 may be loaded by loading the binary to a memory unit of Target Processor 460. Exerciser Image 430 may be executed by the Target Processor 460 and may cause Target Processor 460 to generate tests, execute and check their execution results, thereby enabling verification of the Target Processor 460.

Exerciser Image 430 may be alternatively loaded to an Acceleration Platform 470 which simulates, in a hardware-based manner, Target Processor 460. Acceleration Platform 470 may be configured to simulate operation of a circuit design based upon an HDL definition thereof (475), such as the HDL from which Target Processor 460 is fabricated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:

obtaining a test template, wherein the test template represents an abstract test scenario to be utilized for testing a target processor, wherein the abstract test scenario requires that a value be assigned to a register;

generating a test based on the test template, wherein the test implements the abstract test scenario, wherein the test is a set of instructions that are executable by the target processor; wherein said generating the test comprises:

determining a memory address to retain the value in a memory that is accessible to the target processor, wherein said determining the memory address comprises determining a first offset from a base address of a memory buffer, wherein the memory address is offseted from the base address by the first offset; and adding to the test an instruction to load to the register the value from the memory address, whereby adding a register dependency to the test that is not required by the abstract test scenario, wherein the instruction to load to the register the value from the memory address utilizes the base address and the first offset; and executing the test by the target processor, wherein said executing comprises filling the memory buffer in memory, whereby including the value in the memory address, wherein said filling is performed prior to execution of the instruction to load to the register the value from the memory address.

2. The method of claim 1, wherein said filling is performed prior to executing any instruction of the test.

3. The method of claim 1, wherein said filling is performed based on a second instruction that is included in the test.

4. The method of claim 1, wherein the abstract test scenario requires that a second value be assigned to a second register; wherein said generating comprises:

determining a second memory address to retain the second value in the memory, wherein the second memory address is offseted from the base address by a second offset, wherein the second memory address is within the memory buffer; and adding to the test a second instruction to load to the second register the second value from the second memory address;

wherein said filling the memory buffer in memory comprises updating the memory buffer to include the second value in the second memory address.

5. The method of claim 1, wherein the instruction to load utilizes a reserved register to represent the base address.

6. The method of claim 5, wherein said generating the test based on the test template comprises selecting the reserved register from a plurality set of registers available for the target processor, wherein the test utilizes the reserved register exclusively to represent the base address.

7. The method of claim 1, wherein said generating the test comprises adding one or more invalidating instructions, wherein the one or more invalidating instructions, when executed by the target processor, are configured to cause a page retaining at least a portion of the memory buffer to be invalidated, whereby said executing the test is configured to cause a page fault when the memory buffer is accessed.

8. The method of claim 1, wherein said generating the test comprises: determining to add the register dependency to the test, wherein in response to said determining to add the register dependency to the test, performing said determining the memory address and said adding to the test the instruction to load to the register the value from the memory address.

9. The method of claim 8 further comprises generating a second test based on the test template, wherein said generating the second test comprises determining not to add the register dependency to the second test.

10. The method of claim 1, wherein the value is a constant value, wherein the constant value is one of: a number or a memory address.

11. The method of claim 1, wherein the abstract test scenario defines the value to be selected from a plurality of potential alternative constant values, whereby the value is a constant value in the test.

12. The method of claim 1, wherein said generating the test comprises:

determining a second memory address to retain the memory address in the memory; and adding to the test a second instruction to load to the register the address value from the second memory address; wherein the test is configured to cause the processor to execute the second instruction prior to executing the instruction.

13. The method of claim 12, wherein the memory address and the second memory address are located in different pages in the memory.

14. The method of claim 1, wherein the register dependency comprises at least one of:

a load-load register dependency;

a load-branch register dependency; and a load-store register dependency.

15. The method of claim 1, wherein the target processor comprising a first execution entity and a second execution entity; wherein the test is configured to cause the first execution entity to load the value from an address retained in a reserved register that points to a first page in the memory; and wherein the test is configured to cause the second execution entity to load a second value from an address retained in the reserved register that points to a second page in the memory.

16. A non-transitory computer readable medium retaining program instructions, which program instructions when read by a processor, cause the processor to perform a method comprising:

obtaining a test template, wherein the test template represents an abstract test scenario to be utilized for testing a target processor, wherein the abstract test scenario requires that a value be assigned to a register;

generating a test based on the test template, wherein the test implements the abstract test scenario, wherein the test is a set of instructions that are executable by the target processor; wherein said generating the test comprises:

determining a memory address to retain the value in a memory that is accessible to the target processor, wherein said determining the memory address comprises determining a first offset from a base address of a memory buffer, wherein the memory address is offseted from the base address by the first offset; and adding to the test an instruction to load to the register the value from the memory address, whereby adding a register dependency to the test that is not required by the abstract test scenario, wherein the instruction to load to the register the value from the memory address utilizes the base address and the first offset; and executing the test by the target processor, wherein said executing comprises filling the memory buffer in memory, whereby including the value in the memory address, wherein said filling is performed prior to execution of the instruction to load to the register the value from the memory address.

17. The non-transitory computer readable medium of claim 16, wherein the target processor comprising a first execution entity and a second execution entity; wherein the test is configured to cause the first execution entity to load the value from an address retained in a reserved register that points to a first page in the memory; and wherein the test is configured to cause the second execution entity to load a second value from an address retained in the reserved register that points to a second page in the memory.

18. A computerized apparatus having a processor and coupled memory, the processor being adapted to perform the steps of:

obtaining a test template, wherein the test template represents an abstract test scenario to be utilized for testing a target processor, wherein the abstract test scenario requires that a value be assigned to a register;

generating a test based on the test template, wherein the test implements the abstract test scenario, wherein the test is a set of instructions that are executable by the target processor; wherein said generating the test comprises:

determining a memory address to retain the value in a memory that is accessible to the target processor, wherein said determining the memory address comprises determining a first offset from a base address of a memory buffer, wherein the memory address is offseted from the base address by the first offset; and adding to the test an instruction to load to the register the value from the memory address, whereby adding a register dependency to the test that is not required by the abstract test scenario, wherein the instruction to load to the register the value from the memory address utilizes the base address and the first offset; and executing the test by the target processor, wherein said executing comprises filling the memory buffer in memory, whereby including the value in the memory address, wherein said filling is performed prior to execution of the instruction to load to the register the value from the memory address.

* * * * *